US008407326B2

(12) United States Patent
Abe et al.

(10) Patent No.: US 8,407,326 B2
(45) Date of Patent: Mar. 26, 2013

(54) ANCHORING METHOD FOR COMPUTING AN XPATH EXPRESSION

(75) Inventors: Mari Abe, Kanagawa (JP); Scott D. DeWitt, Cary, NC (US); Masahiro Hori, Kanagawa-ken (JP); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2966 days.

(21) Appl. No.: 10/128,474

(22) Filed: Apr. 23, 2002

(65) Prior Publication Data
US 2003/0200506 A1 Oct. 23, 2003

(51) Int. Cl.
*G06F 15/173* (2006.01)
(52) U.S. Cl. .................. 709/223; 709/238; 715/234
(58) Field of Classification Search .................. 715/513, 715/522, 523, 234; 709/246, 223, 238; 707/3
See application file for complete search history.

(56) References Cited

U.S. PATENT DOCUMENTS
2002/0078094 A1* 6/2002 Krishnaprasad et al. ..... 707/513

OTHER PUBLICATIONS

J. Clark and S. DeRose, XML Path Language (Xpath) Version 1.0, *W3C Recommendation*, <http://www.w3.org/TR/xpath>, Nov. 16, 1999.
XML Authoring Tool: FREEDOM, *IBM Corporation Research*, < http://www.trl.ibm.com/projects/freedom/index_e.htm>, (Jan. 4, 2002).
M. Hori, G. Kondoh, K. Ono, S. Hirose and S. Singhal, *Annotation-Based Web Content Transcoding*, Proceedings of the 9th World Wide Web Conference (WWW-9), <http://www9.org/w9cdrom/169/169.html>, (Jan. 4, 2002).
M. Abe and M. Hori, A Visual Approach to Authoring Xpath Expressions, *Extreme Markup Languages 2001*, <http://ares.trl.ibm.com/freedom/doc/extml2001/abe0114.html>, (Jan. 18, 2002).

* cited by examiner

*Primary Examiner* — April Shan
(74) *Attorney, Agent, or Firm* — Steven M. Greenberg, Esq.; Carey, Rodriguez, Greenberg & O'Keefe

(57) ABSTRACT

An anchoring method for generating an XPath expression. The method can include identifying a stable anchor in the transcodable markup along an axis shared by the selected node. An XPath expression can be generated for the stable anchor. Subsequently, an offset between the stable anchor and the selected node can be computed. Finally, the XPath expression for the stable anchor and the offset can be concatenated, the concatenation forming the XPath expression for the selected node.

16 Claims, 3 Drawing Sheets

ANCHORING METHOD FOR COMPUTING AN XPATH EXPRESSION

BACKGROUND OF THE INVENTION

1. Statement of the Technical Field

The present invention relates to the field of Web content transcoding and more particularly to generating XPATH expressions.

2. Description of the Related Art

End-users increasingly access Web content with devices other than conventional desktop content browsers. Such devices include personal digital assistants, cellular telephones and cable television set top boxes. Yet, as these devices lack the same rendering capabilities as the conventional desktop content browser, it is necessary to adapt the Web content from one format intended for use in one type of device, to a another format suitable for rendering in another device. This content adaptation process has been referred to as "transcoding".

The transcoding process can be facilitated through the use of information about the Web content, referred to hereinafter as "meta-information". Meta-information can be provided with the original Web content and can be used to assist the transcoding process in uniquely identifying portions of the Web content. Notably, meta-information can be created without any modification of the original Web content if the meta information is described separately from the Web content. In this regard, the separate provision of such meta-information often is referred to as "external annotation".

External annotations consist of the meta-information and corresponding references to portions of the original Web content. The meta-information and references typically are described according to the Resource Description Framework (RDF) and the XML Path/Pointer (XPath/XPointer) specification. XPath is a syntax for identifying particular sections of markup, such as an HTML or XML formatted document. Each of the RDF and XPath/XPointer specifications have been standardized by the World Wide Web Consortium, referred to hereafter as the "W3C".

XPath, described in depth in James Clark and Steve DeRose, *XML Path Language (XPath) Version 1.0.* W3C Recommendation (Nov. 16, 1999), arose from an effort to provide a common syntax and semantics for functionality which is shared between Extensible Style Sheet Transformations (XSLT) and XPointer. A primary purpose of XPath is to address parts of an XML document in support of which XPath provides basic facilities for manipulating strings, numbers and boolean values. XPath uses a compact, non-XML syntax to facilitate the use of XPath technology within Universal Resource Indicators (URI) and an XML attribute value. XPath operates on the abstract, logical structure of an XML document, rather than its surface syntax. Thus, XPath is aptly named in view of its URL-like path notion for navigating through the hierarchical structure of an XML document.

Notably, XPath expressions can be difficult to create. The XPath standard syntax requires an understanding of complex concepts, including multiple axes and predicates. As will be recognized by one skilled in the art, the XPath syntax plainly is unusual and non-intuitive. Importantly, though creating simplistic XPath expressions can be problematic, creating robust XPath expressions which remain valid notwithstanding changing portions of referenced markup can be even more so problematic. In particular, conventional XPath creation techniques are not configured to handle changing content relied upon as a reference point in associated markup.

For example, the structure and content of hypertext markup language (HTML) documents are known to change with time as the information contained in the HTML document sometimes can be updated hourly or daily. As the contents and structure of the document changes, however, associated annotations which uniquely identify those changed portions of the HTML document can become invalid. This can be particularly true where specific annotations uniquely identify portions of the changing HTML document by reference to a specific document structure. Hence, conventional annotation methods are ineffective in the face of a dynamically changing document.

SUMMARY OF THE INVENTION

The present invention is an anchoring method for computing an XPath expression which can remain valid, even when portions of a markup language formatted document change. In accordance with one aspect of the present invention, an anchoring method for generating an XPath expression for a selected node in transcodable markup can include identifying a stable anchor in the transcodable markup along an axis shared by the selected node. An XPath expression can be generated for the stable anchor. Subsequently, an offset between the stable anchor and the selected node can be computed. Finally, the XPath expression for the stable anchor and the offset can be concatenated, the concatenation forming the XPath expression for the selected node.

Notably, in a preferred aspect of the invention, the identifying step can include the step of locating within the transcodable markup content which has been pre-determined to be unlikely to change over time. In that regard, the identifying step can include the step of locating within the transcodable markup a unique trait selected from the group consisting of displayable headers, displayable footers, comments and text. Moreover, as it will not always be the case where a stable anchor can be located in the transcodable content, the method can further include the step of determining whether a stable anchor exists in the transcodable markup; and, if it is determined that a stable anchor does not exist within the transcodable markup, reporting the determination.

An anchoring method for generating an XPath expression for a selected node within transcodable content alternatively can include transforming the transcodable content into a set of nodes in a document object model (DOM) and traversing each axis in the DOM in search of a node with a unique trait within a threshold distance. If such a node is found in one of the axes during the traversing step, an XPath expression can be generated based upon the unique trait. Once generated, the XPath expression can uniquely identifying the node as a stable anchor;

An offset for the node can be generated. Though many techniques can be used to generate the offset, in one aspect of the invention, an axis between the selected node and the stable anchor can be selected. Location steps for each node in the selected axis can be generated. Finally, the location steps can be concatenated to produce the offset. Once the offset has been generated, the generated XPath uniquely identifying the stable anchor and the generated offset can be combined. As will be recognized by one skilled in the art, the combination can produce an XPath expression for the selected node based upon the stable anchor.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an anchoring method for computing an XPath expression. In particular, the anchoring method can be included amongst other XPath generation methods in a system for generating and resolving robust XPath expressions. In accordance with the present invention, a specified portion of transcodable markup can be identified as "stable" inasmuch as the selected portion is unlikely to change, regardless of other changes to the transcodable markup. Once the stable portion of the transcodable markup has been identified, an XPath expression can be generated for the stable portion.

Subsequently, an offset for an interested portion of the transcodable markup can be generated, the offset identifying the location of the interested portion within the transcodable markup relative to the stable portion of the transcodable markup. Finally, the XPath expression for the stable portion can be combined with the offset to produce an XPath expression for the interested portion which otherwise will remain viable, notwithstanding changes to the transcodable markup.

Figure 1:
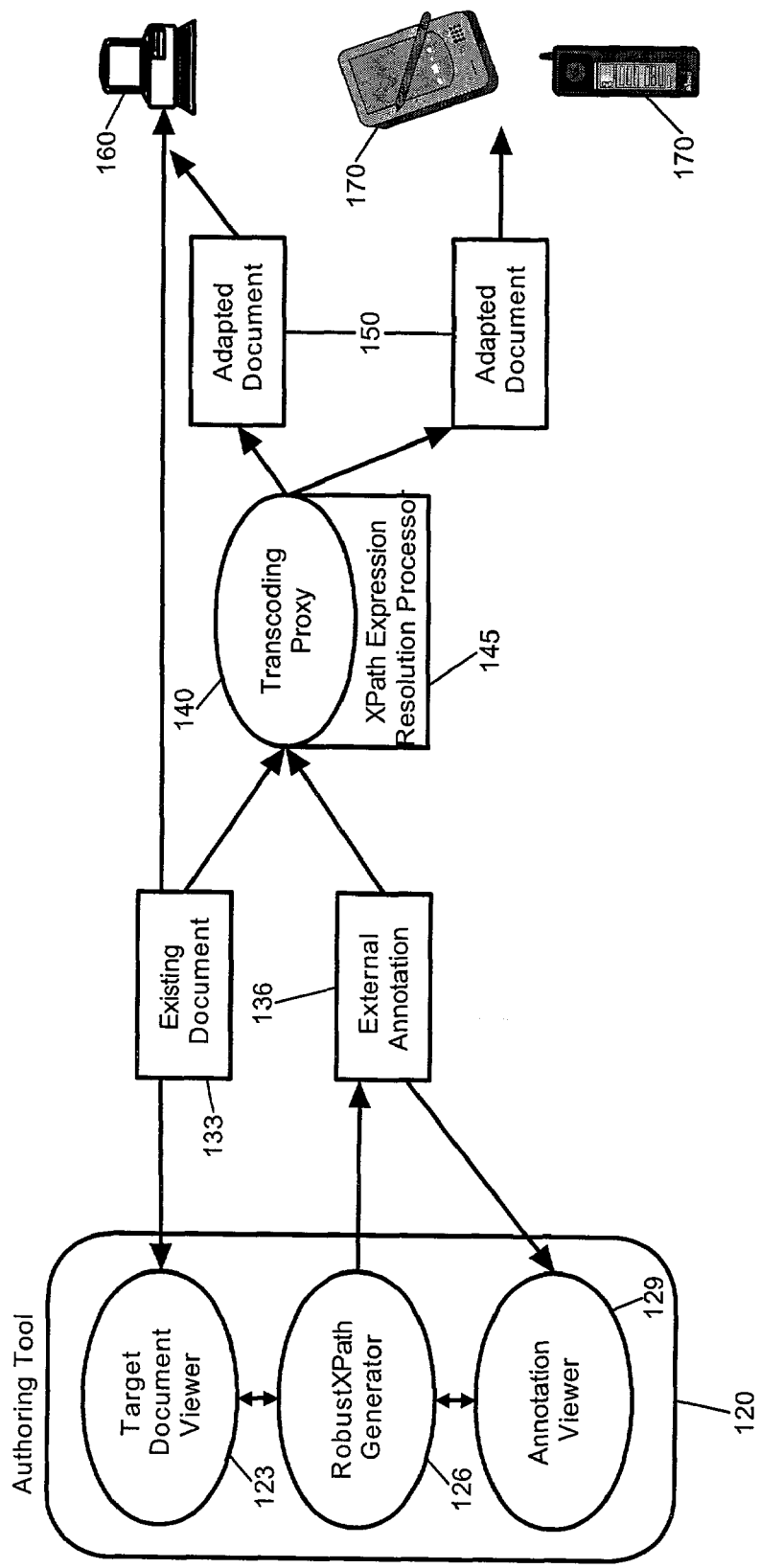
FIG. 1 is a pictorial illustration of a content transcoding system configured to generate and use robust XPath expressions in accordance with the inventive arrangements.

FIG. 1 is a pictorial illustration of a content transcoding system configured to generate and use robust XPath expressions. The system can include an authoring tool 120 which can be used to annotate existing transcodable content 133 configured for presentation in a particular computing platform 160, for instance a personal computer content browser. A transcoding proxy 140 can process the existing document 133, in combination with an external annotation 136 created by the authoring tool 120 to produce an adapted document 150 which can be presented in other computing platforms 170, for instance in a pervasive device microbrowser.

The authoring tool 120 can include a target document viewer 123, an annotation viewer 129 and a robust XPath expression generator 126. The target document viewer 123 can be used to present the markup in an existing document 133. The annotation viewer, by comparison, can be used to present the external annotation 136 produced in reference to the existing document 133. Finally, the robust XPath expression generator 126 can be used to generate a set of XPath expressions for a selected node in the existing document 133 using both tag specific and general XPath expression generation methodologies.

A run-time XPath expression resolution process 145 included in association with the transcoding proxy 140 can identify the selected node most likely referred to by the XPath expressions in the generated set during the transcoding process. Importantly, the run-time XPath expression resolution process 145 can identify the node, even where some of the XPath expressions in the set no longer validly refer to the selected node. Hence, the redundancy provided by the set of XPath expressions can result in the valid identification of a selected node notwithstanding changes to the transcodable markup.

Notably, the invention is not limited to the precise instrumentalities illustrated in FIG. 1. In particular, inasmuch as the present invention is an anchoring method for computing an XPath expression, a visual authoring tool is not required. Rather, any tool for authoring external annotations, whether visual or otherwise, can suffice as a platform with which a set of robust XPath expressions can be generated for a selected node. Moreover, while the present invention includes a coupling of both generation-time and run-time methods, any actual method of presenting transcoded content can suffice so long as the run-time methodology suitably identifies the selected node based upon the robust XPath expressions in the set.

In operation, a node in transcodable content can be selected for which a set of redundant XPath expressions can be generated. The redundant XPath expressions can be generated using a variety of XPath generation methods, for example using a tag-specific method, a filtering method, and an anchoring-based method as will be described herein. Hence, each configured XPath generation method can be applied in succession in order to generate a redundant set of candidate XPath expressions.

Notably, a tag specific XPath expression generation methodology can express the location of selected node according to traits associated with a markup language tag, for instance the HTML tag, "FORM" or the HTML tag "IMG". By comparison, a filtering technique for locating the selected node in transcodable content can include the successive application of XPaths the combination of which absolutely identify the selected node. Finally, in accordance with the present invention, an anchoring-based XPath generation methodology can express the absolute location of a selected node based upon a location relative to another node. In all cases, however, for each methodology applied, a candidate XPath expression can be generated.

Figure 2:
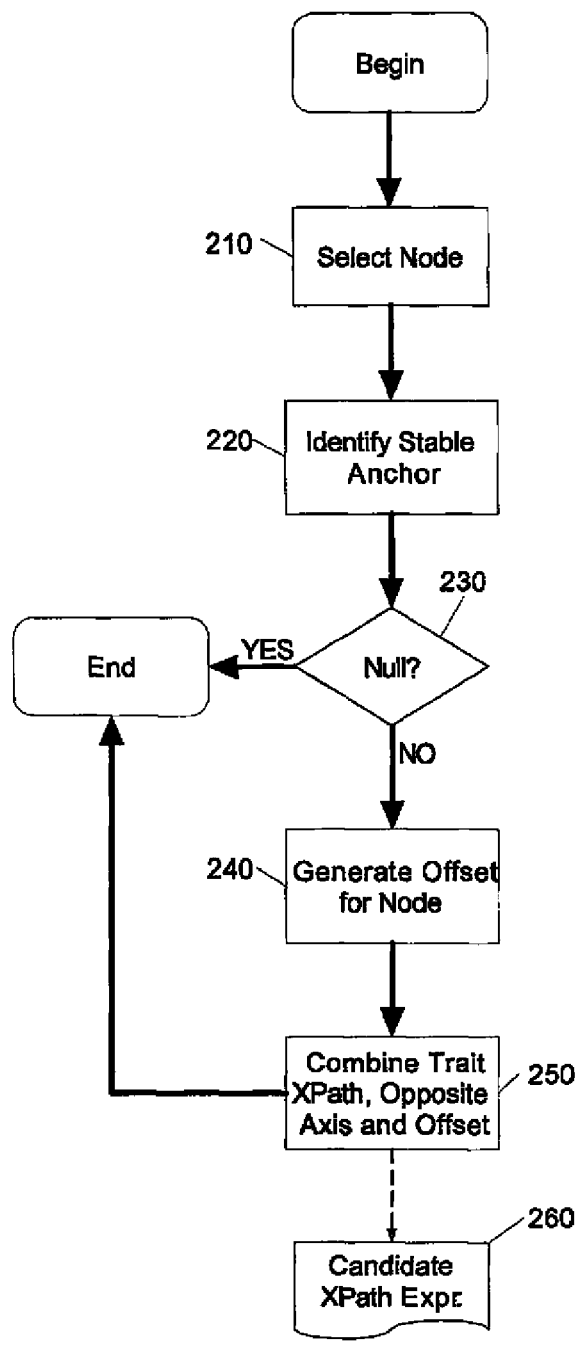
FIG. 2 is a flow chart illustrating a process for identifying a stable anchor in the content transcoding system of FIG. 1; and, FIG. 3 is a flow chart illustrating a process for computing an XPath expression based upon the stable anchor identified in FIG. 2.

FIG. 2 is a flow chart illustrating a process for computing an XPath expression based upon a stable anchor. In the anchoring method, an XPath expression can be generated which specifies the location of the selected node relative to a stable, "anchor" node. Importantly, the anchor can be selected based upon a node in the transcodable markup which would be likely to survive and maintain its positioning within the transcodable markup, notwithstanding changes thereto. The anchor can be considered a "stable anchor" programmatically based upon, for example, where the anchor node contains a unique trait which is likely not to change over time. Examples of such unique traits can include comments, text and displayable text headings and footings.

Essentially, unique traits are those which when searched upon within the markup, will resolve to a single location within the markup. Examples include both structural and non-structural traits. While structural traits are those traits based upon the structure of the markup, non-structural traits are those traits based upon the content of the markup. For instance, a unique structural trait could include "a table within a form". By comparison, a unique non-structural trait could include the string "weather" within a comment.

Initially, in block 210 a node can be selected in the transcodable content for which a candidate XPath expression 260 can be computed. As will be recognized by one skilled in the art, the selection of the node can be facilitated by first parsing the transcodable content and subsequently arranging the parsed content into a DOM. The process of producing a DOM based upon transcodable content is well-known in the art. Additionally, by producing the DOM, the transcodable content can be more easily analyzed and XPath expressions both for a stable anchor and a selected node can be computed more easily in accordance with the present invention. Notwithstanding, the invention is not so limited to the use of a DOM and any method for analyzing the transcodable content can suffice.

In any event, in block 220 a stable anchor can be identified in the transcodable markup according to a process for locating a stable anchor and for generating an XPath expression therefor, as will be described herein. As noted, a stable anchor can be identified based upon a selected portion of the transcodable markup which is unlikely to change over time. Typical stable anchors can include comments, text or text headings or footings. In one aspect of the invention, each node within a threshold distance along an axis can be inspected for a unique trait, beginning with, for example, an ancestor node. Once ancestor nodes along ancestor axes have been inspected, the process can continue if necessary along descendant and sibling axes.

Figure 3:
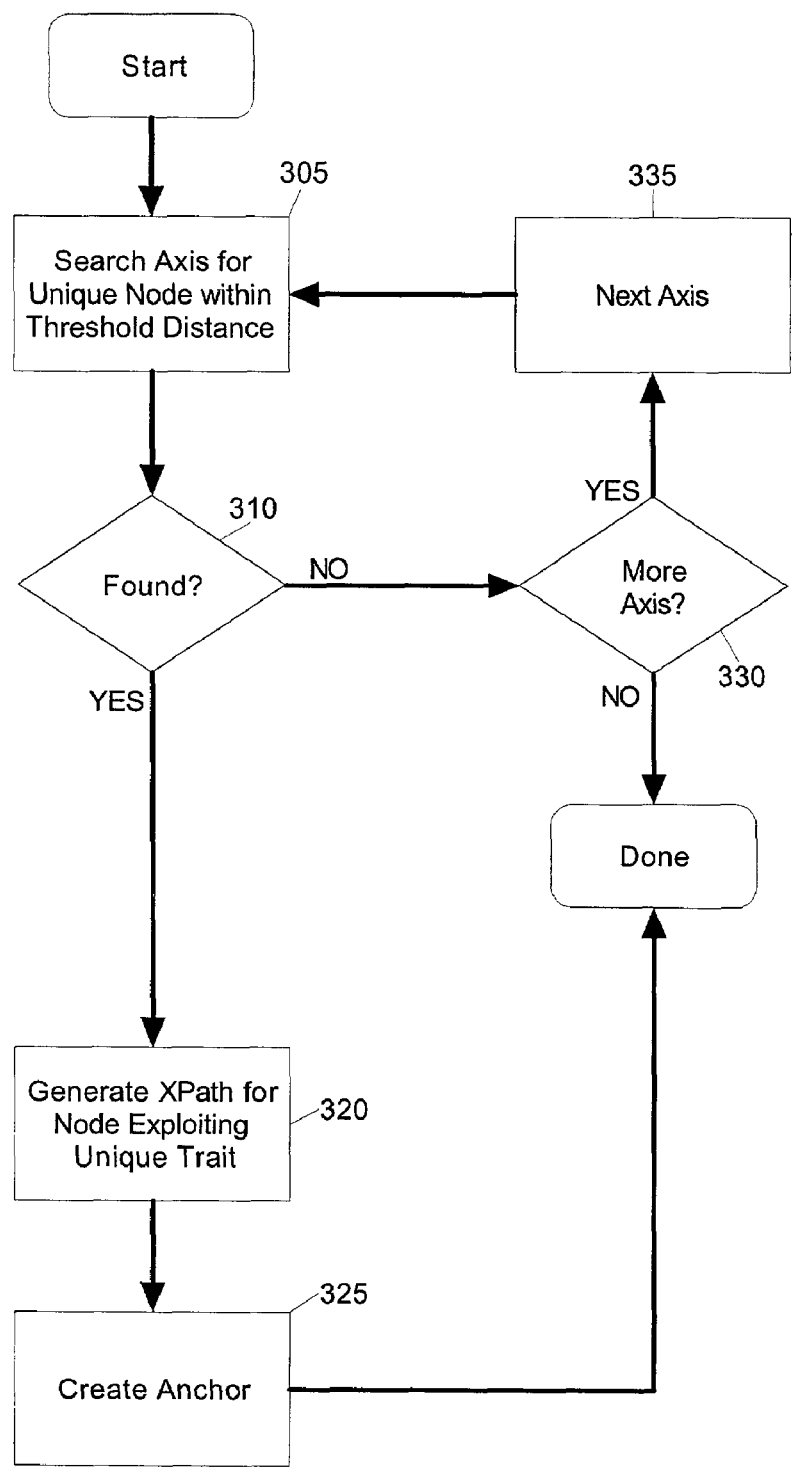

In any case, to the extent a stable anchor can be identified, an XPath expression uniquely identifying the stable anchor can be generated. Otherwise, the process for locating the stable anchor can return the null set. FIG. 3 is a flow chart illustrating an exemplary process for identifying a stable anchor as specified in block 220 of FIG. 2. Beginning in block 305, a first axis of the selected node can be searched for a node having a uniquely identifiable trait. The unique trait can include, for example, a unique substring. Notably, only those nodes along the axis can be searched which are within a threshold number of steps away from the selected node. If, in decision block 310, no nodes are found within the threshold distance of the axis, in block 330 and 335, the next axis can be searched, and the process can repeat until no axes remain to be searched. Though the invention is not so limited, the axes can be searched in the following order: descendant, ancestor, previous-sibling, following-sibling, previous and following.

When a node has been located in the subject axis which has the specified unique trait, in block 320 an XPath expression can be generated for that node based upon the unique trait. For instance, a node type and predicate can be formed and combined into an XPath expression which uniquely specifies the identified trait. Subsequently, in block 325, an XPath expression can be generated for the identified stable anchor according to the trait XPath. If, in the process illustrated in blocks 315 through 325, a stable anchor cannot be identified along any axis, however, a null set can be returned.

Returning now to FIG. 2, if in decision block 230 the process for locating the stable anchor returns the null set, in which case a stable anchor cannot be identified, the method illustrated in FIG. 2 can end. Otherwise, in block 240 an offset can be determined between the stable anchor and the selected node along the axis. Specifically, the offset can identify the relative location of the selected node from the stable anchor along an axis joining both.

Many techniques can be applied in computing the offset. For instance, in one aspect of the invention, an axis joining the stable anchor and the selected node can be selected. A location step can be computed for each node in the selected axis, beginning with the node closest to the stable anchor. In particular, a location step can include both a node test identifying the name of the node and a predicate expression, such as an ordinal predicate expression. Essentially, the node test specifies the type of element in the node, while the ordinal predicate expression specifies the distance of the node from the stable anchor.

Notwithstanding, other types of offset generation techniques can suffice. In essence, any method for generating an offset can be applied so long as the offset uniquely identifies the location of the selected node relative to the stable anchor. In particular, it will be apparent that the offset can have a purely structurally defined location, a purely content defined location, or an amalgamation of structural and content constraints used to locate the selected node relative to the stable anchor. In any case, in block 260, the offset can be combined with the axis and the XPath expression of the stable anchor to produce the candidate XPath expression 270 for the selected node.

Once a set of candidate XPath expressions have been generated, not only in accordance with the anchoring method of the present invention, but also in accordance with the tag-specific and cascading filtering methods specified above, a run-time XPath expression resolution process can redundantly albeit accurately resolve a suitable XPath expression for a selected node. Specifically, each candidate XPath expression can be loaded and evaluated, each evaluation specifying a candidate node in the transcodable markup. Once specified, the candidate node can be compared to previously evaluated candidate nodes.

If a match is detected, a tally associated with the candidate node can be incremented, indicating that multiple candidate XPath expressions resolve to the same candidate node. Otherwise, if a match is not detected, the candidate node can be added to the set of previously evaluated candidate nodes. In both cases, if additional candidate XPath expressions remain to be evaluated, the next candidate XPath expression can be loaded and the process can repeat. When no more candidate XPath expressions remain to be evaluated, it can be determined from the tallies whether any particular candidate node has been specified by a notable number of XPath expressions, for instance by a plurality or majority of all of the XPath expressions.

If so, the predominately specified candidate node can be identified and an associated annotation can be applied to the predominately specified candidate node. Otherwise, it can be assumed that the XPath expression is inherently unstable and the annotation can be skipped. Importantly, by redundantly applying candidate XPath expressions to resolve the identity of a context node, transcoding accuracy can be markedly improved. Consequently, the XPath expression developer can be relieved of the burden of meticulously examining the content of transcodable markup to determine those unique characteristics that can be used to robustly identify nodes in the transcodable markup. Furthermore, robust XPath expressions can be authored with confidence regardless of the likelihood that the content of the transcodable markup will change over time.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An anchoring method for generating an XPath expression for a selected node in transcodable markup comprising the steps of:
 identifying a stable anchor in the transcodable markup along an axis shared by the selected node;
 generating, by a computing device, an XPath expression for said stable anchor;
 computing an offset between said stable anchor and the selected node; and,
 concatenating said offset and said XPath expression for said stable anchor, said concatenation forming the XPath expression for the selected node;
 wherein said identifying step comprises the step of locating within the transcodable markup content which has been pre-determined to be unlikely to change over time.

2. The anchoring method of claim 1, wherein said identifying step comprises the step of locating within the transcodable markup a node with a unique trait selected from the group consisting of displayable headers, displayable footers, comments and text.

3. The anchoring method of claim 1, wherein said identifying step further comprises the steps of:
 determining whether a stable anchor exists in the transcodable markup; and,
 when it is determined that a stable anchor does not exist within the transcodable markup, reporting said determination.

4. The anchoring method of claim 1, wherein said computing step comprises the steps of:
 selecting an axis between the selected node and said stable anchor;
 generating location steps for each node in said selected axis between the elected node and said stable anchor; and,
 concatenating said location steps to produce said offset.

5. The anchoring method of claim 4, wherein said step of generating location steps comprises the steps of, for each node in said selected axis between the selected node and said stable anchor, generating a node test based upon a name of said node, further generating an ordinal predicate defining a number of steps said node resides away from said stable anchor in said selected axis, and, combining said node test and said ordinal predicate to produce said location step for said node.

6. An anchoring method for generating an XPath expression for a selected node within transcodable content comprising the steps of:
 transforming the transcodable content into a set of nodes in a document object model (DOM) and traversing each axis in said DOM in search of a node with a unique trait within a threshold distance;
 when said node is found in one of said axes during said traversing step, and, generating an XPath expression based upon said unique trait, said XPath expression uniquely identifying said node as a stable anchor;
 generating, by a computing device, an offset for said node along an axis joining said stable anchor and the selected node; and,
 combining said generated XPath uniquely identifying said stable anchor and said generated offset, said combination producing an XPath expression for the selected node based upon said stable anchor;
 wherein said step of identifying a unique trait comprises the step of locating within said node a trait which has been pre-determined to be unlikely to change over time.

7. The anchoring method of claim 6, wherein said step of identifying a unique trait comprises the step of locating within the said node a trait selected from the group consisting of displayable headers, displayable footers, comments, and text.

8. The anchoring method of claim 6, wherein said generating step comprises the steps of:
 selecting an axis between the selected node and said stable anchor;
 generating location steps for each node in said selected axis between the selected node and said stable anchor; and,
 concatenating said location steps to produce said offset.

9. A machine readable storage device having stored thereon a computer program for generating an XPath expression for a selected node in transcodable markup, the computer program comprising a routine set of instructions for causing the machine to perform the steps of:
 identifying a stable anchor in the transcodable markup along an axis shared by the selected node;
 generating an XPath expression for said stable anchor;
 computing an offset between said stable anchor and the selected node; and, concatenating said offset and said XPath expression for said stable anchor, said concatenation forming the XPath expression for the selected node;
 wherein said identifying step comprises the step of locating within the transcodable markup content which has been pre-determined to be unlikely to change over time.

10. The machine readable storage device of claim 9, wherein said identifying step comprises the step of locating within the transcodable markup a node with a unique trait selected from the group consisting of displayable headers, displayable footers, comments, and text.

11. The machine readable storage device of claim 9, wherein said identifying step further comprises the steps of:
 determining whether a stable anchor exists in the transcodable markup; and,
 when it is determined that a stable anchor does not exist within the transcodable markup, reporting said determination.

12. The machine readable storage device of claim 9, wherein said computing step comprises the steps of:
 selecting an axis between the selected node and said stable anchor;
 generating location steps for each node in said selected axis between the selected node and said stable anchor; and,
 concatenating said location steps to produce said offset.

13. The machine readable storage device of claim 12, wherein said step of generating location steps comprises the steps of, for each node in said selected axis between the selected node and said stable anchor, generating a node test based upon a name of said node, further generating an ordinal predicate defining a number of steps said node resides away from said stable anchor in said selected axis, and, combining said node test and said ordinal predicate to produce said location step for said node.

14. A machine readable storage device having stored thereon a computer program for generating an XPath expression for a selected node in transcodable markup, the computer program comprising a routine set of instructions for causing the machine to perform the steps of:

- transforming the transcodable content into a set of nodes in a document object model (DOM) and traversing each axis in said DOM in search of a node with a unique trait within a threshold distance;
- when said node is found in one of said axes during said traversing step, and, generating an XPath expression based upon said unique trait, said XPath expression uniquely identifying said node as a stable anchor;
- generating an offset for said node along an axis joining said stable anchor and the selected node; and,
- combining said generated XPath uniquely identifying said stable anchor and said generated offset, said combination producing an XPath expression for the selected node based upon said stable anchor;

wherein said step of identifying a unique trait comprises the step of locating within said node a trait which has been pre-determined to be unlikely to change over time.

15. The machine readable storage device of claim 14, wherein said step of identifying a unique trait comprises the step of locating within the said node a trait selected from the group consisting of displayable headers, displayable footers, comments, and text.

16. The machine readable storage device of claim 14, wherein said generating step comprises the steps of:

- selecting an axis between the selected node and said stable anchor;
- generating location steps for each node in said selected axis between the selected node and said stable anchor; and,
- concatenating said location steps to produce said offset.

* * * * *